US009553461B2

(12) United States Patent
Amemiya et al.

(10) Patent No.: US 9,553,461 B2
(45) Date of Patent: Jan. 24, 2017

(54) CHARGE CONTROL CIRCUIT, CHARGE CIRCUIT, AND MOBILE DEVICE

(71) Applicant: Semiconductor Components Industries, LLC, Phoenix, AZ (US)

(72) Inventors: Keiji Amemiya, Saitama-ken (JP); Yasuaki Hayashi, Gunma-ken (JP)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 401 days.

(21) Appl. No.: 13/869,472

(22) Filed: Apr. 24, 2013

(65) Prior Publication Data

US 2013/0307490 A1 Nov. 21, 2013

(30) Foreign Application Priority Data

Apr. 24, 2012 (JP) .................................. 2012-098984

(51) Int. Cl.
| | |
|---|---|
| *H02J 7/04* | (2006.01) |
| *H02J 7/00* | (2006.01) |
| *H02J 3/12* | (2006.01) |
| *G05F 1/00* | (2006.01) |

(52) U.S. Cl.
CPC ............ *H02J 7/0029* (2013.01); *H02J 7/0073* (2013.01); *H02J 2007/0062* (2013.01)

(58) Field of Classification Search
CPC .................................. H02J 7/00; H02J 7/0029
USPC ........ 320/162, 137, 128; 323/246, 266, 271, 323/274, 282
See application file for complete search history.

(56) References Cited

U.S. PATENT DOCUMENTS

| | | | | |
|---|---|---|---|---|
| 5,359,280 | A * | 10/1994 | Canter et al. ................. | 323/282 |
| 6,147,477 | A | 11/2000 | Saeki et al. | |
| 6,452,368 | B1 * | 9/2002 | Basso et al. ................. | 323/282 |
| 6,664,772 | B2 | 12/2003 | Saeki et al. | |
| 6,900,624 | B2 | 5/2005 | Abo | |
| 6,911,806 | B2 | 6/2005 | Saeki et al. | |
| 7,049,801 | B2 * | 5/2006 | Kuo ..................... | H02M 3/156 323/285 |
| 7,253,596 | B2 * | 8/2007 | Yamamoto et al. .......... | 323/281 |
| 7,663,356 | B2 * | 2/2010 | Inatomi ........................ | 323/283 |
| 7,701,181 | B2 * | 4/2010 | Inoue ........................... | 323/268 |

(Continued)

FOREIGN PATENT DOCUMENTS

| | | |
|---|---|---|
| JP | 2002-315313 A | 10/2002 |
| JP | 2009-284585 A | 12/2009 |
| JP | 2010-172154 A | 8/2010 |

*Primary Examiner* — M'Baye Diao
(74) *Attorney, Agent, or Firm* — Rennie William Dover

(57) ABSTRACT

A charge control circuit includes: a charge/discharge circuit to charge a capacitor when an input current from an input power supply is smaller than a first current, and discharge the capacitor when the input current is greater than the first current; a discharge circuit to discharge the capacitor when the input current becomes greater than a second current greater than the first current; an error amplifier circuit to amplify an error between a lower voltage between a capacitor charging voltage and a reference voltage corresponding to the maximum output voltage, and a feedback voltage corresponding to the output voltage; and a drive circuit to perform switching of a transistor of a booster circuit, including an inductor and the transistor to increase an inductor current, configured to boost the output voltage by supplying the inductor current to the terminal when the transistor is off, so that the error becomes smaller.

20 Claims, 3 Drawing Sheets

(56) References Cited

U.S. PATENT DOCUMENTS

| | | | | |
|---|---|---|---|---|
| 2009/0051428 A1* | 2/2009 | Amemiya et al. | ............ | 330/254 |
| 2009/0243568 A1* | 10/2009 | Nguyen | ......................... | 323/274 |
| 2010/0164858 A1* | 7/2010 | Kikuchi | ............ | H05B 41/2828 |
| | | | | 345/102 |
| 2012/0126768 A1* | 5/2012 | Ishino | ........................... | 323/283 |

* cited by examiner

CHARGE CONTROL CIRCUIT, CHARGE CIRCUIT, AND MOBILE DEVICE

CROSS-REFERENCE TO RELATED APPLICATION

This application claims the benefit of priority to Japanese Patent Application No. 2012-098984, filed Apr. 24, 2012, of which full contents are incorporated herein by reference.

BACKGROUND OF THE INVENTION

Field of the Invention

The present invention relates to a charge control circuit, a charge circuit, and a mobile device.

Description of the Related Art

A charge circuit that charges a battery (secondary battery) such as a lithium-ion battery generally operates in a constant current mode in which the battery is charged with the constant current or in a constant voltage mode in which the battery is charged with the constant voltage (see, e.g., Japanese Laid-Open Patent Publication No. 2009-284585).

Incidentally, some charge circuits generate the constant voltage to drive a load (e.g., a microcomputer, etc.) connected to an output terminal of the charge circuit even in a state where the battery is not connected to the charge circuit. When the battery having room for charging, that is to say, the battery whose battery voltage is lowered, is connected to the output terminal of such a charge circuit, an overcurrent flows from an input side of the charge circuit to the battery.

SUMMARY OF THE INVENTION

A charge control circuit according to an aspect of the present invention, which is configured to control a charge circuit configured to generate, from an input power supply, an output voltage for charging the battery at a terminal connected to a battery, the charge control circuit includes: a charge/discharge circuit configured to charge a capacitor when an input current from the input power supply is smaller than a first current, and discharge the capacitor when the input current is greater than the first current; a discharge circuit configured to discharge the capacitor when the input current becomes greater than a second current greater than the first current; an error amplifier circuit configured to amplify an error between a lower voltage out of a charging voltage of the capacitor and a reference voltage corresponding to a maximum value of the output voltage, and a feedback voltage corresponding to the output voltage; and a drive circuit configured to perform switching of a transistor of a booster circuit including an inductor supplied with the input current, including the transistor configured to increase an inductor current flowing through the inductor when the transistor is turned on, and being configured to boost the output voltage by supplying the inductor current to the terminal when the transistor is off, in such a manner that the error becomes smaller.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Outline of Charge Circuit 10

Figure 1:
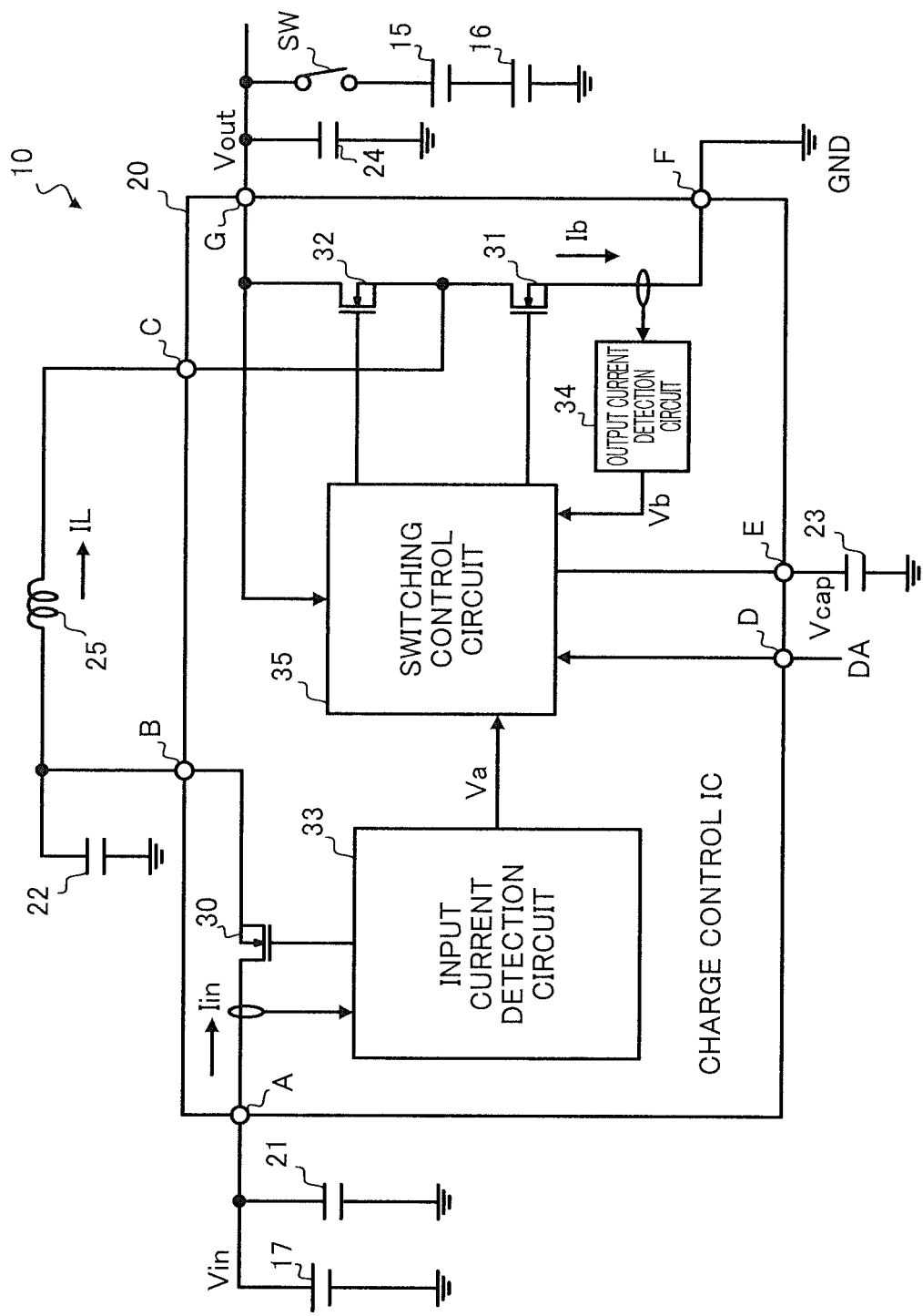
FIG. 1 is a diagram illustrating an outline of a charge circuit 10 applied with the present invention.

FIG. 1 is a diagram illustrating a configuration of a charge circuit 10 applied with the present invention. The charge circuit 10 is a circuit to charge two-cell lithium-ion batteries (hereinafter, simply referred to as batteries) 15 and 16 with a constant current or a constant voltage. Note that since the voltage of a one-cell lithium-ion battery changes, for example, from 2.4 V to 4.2 V, the voltage generated in the two-cell batteries 15 and 16 is from 4.8 V to 8.4 V. The charge circuit 10 charges the batteries 15 and 16, for example, based on a voltage of a power supply 17 to be supplied from a USB (Universal Serial Bus) bus.

The charge circuit 10 includes a charge control IC (Integrated Circuit) 20, capacitors 21 to 24, an inductor 25, and a resistor 26.

The charge control IC 20 (charge control circuit) is a circuit to generate an output voltage Vout higher than an input voltage Vin (e.g., 5 V) from the power supply 17 by controlling an inductor current IL flowing through the inductor 25, and includes NMOS transistors 30 to 32, an input current detection circuit 33, an output current detection circuit 34, a switching control circuit 35, and terminals A to G. The NMOS transistors 31 and 32 may be external components and the NMOS transistor 32 may be a diode or a PMOS transistor.

The terminal A is applied with the input voltage Vin from the power supply 17 (input power supply), and is connected to the capacitor 21 to stabilize the input voltage Vin.

The NMOS transistor 30 has its drain connected to the terminal A, and has its source connected to the terminal B.

The input current detection circuit 33 is a circuit to detect an input current Iin inputted from the power supply 17 via the terminal A, and generate a voltage Va (second voltage) that rises with an increase in the input current Iin. The input current detection circuit 33 detects the input current Iin, using a current-detection resistor, a current mirror circuit of the NMOS transistor 30, etc. Further, the input current detection circuit 33 applies a voltage, with which the NMOS transistor 30 is brought into a full-on state, to the gate of the NMOS transistor 30 when the output voltage Vout is being stepped up.

Each one end of the capacitor 22 and the inductor 25 is connected to the terminal B. The other end of the inductor 25, the drain of the NMOS transistor 31, and the source of the NMOS transistor 32 are connected to the terminal C. The source of the NMOS transistor 31 is connected to the grounded terminal F.

Thus, the inductor 25 and the NMOS transistors 31 and 32 constitute a boost chopper circuit (booster circuit) to boost the input voltage Vin. Specifically, when the NMOS transistor 32 is turned off and the NMOS transistor 31 is turned on, the inductor current IL flowing through the inductor 25 increases. When the NMOS transistor 31 is turned off and the NMOS transistor 32 is turned on, the energy stored in the inductor 25 is discharged to the capacitor 24 via the terminal G. Therefore, the output voltage Vout generated at the terminal G is stepped up. The batteries 15 and 16 are connected to the terminal G. Note that a switch SW between the batteries 15 and 16 and the terminal G, although not actually provided, is illustrated for easy understanding of whether the batteries 15 and 16 are connected to the terminal G. A load (not shown) such as a microcomputer, etc., which operates with the output voltage Vout is connected to the terminal G.

The output current detection circuit 34 is a circuit to generate a voltage Vb that rises with an increase in a current Ib flowing through the NMOS transistor 31. Note that the output current detection circuit 34, similarly to the input current detection circuit 33, detects the current Ib, using the current-detection resistor, the current mirror circuit of the NMOS transistor 31, etc.

Figure 2:
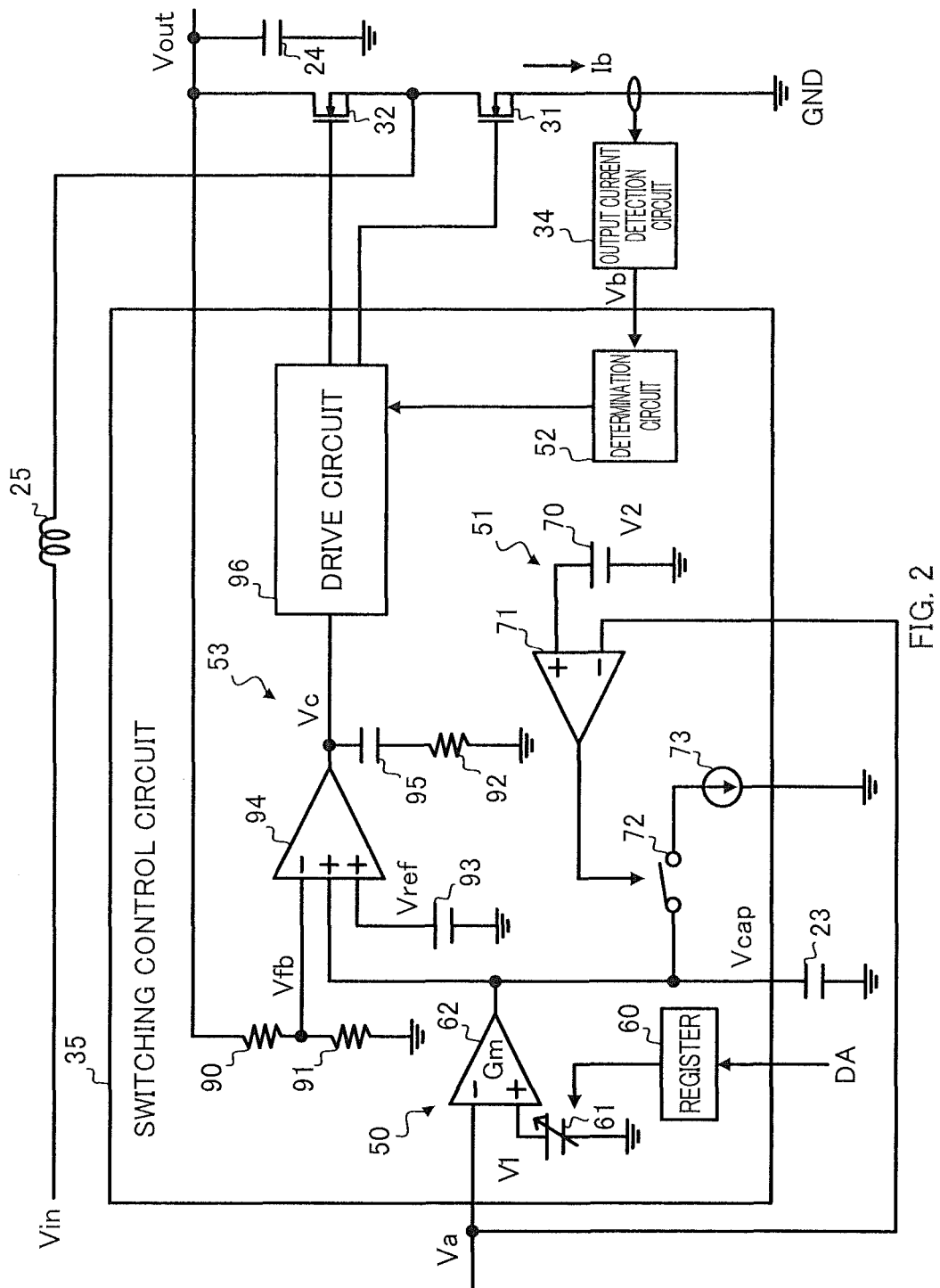
FIG. 2 is a diagram illustrating one example of a switching control circuit 35.

The switching control circuit 35 controls switching of the NMOS transistors 31 and 32 based on the voltages Va and Vb and the output voltage Vout. As illustrated in FIG. 2, the switching control circuit 35 includes a charge/discharge circuit 50, a discharge circuit 51, a determination circuit 52, and a switching circuit 53. Note that since FIG. 2 is a diagram for describing the details of the switching control circuit 35, the terminal A, the NMOS transistor 30, etc., illustrated in FIG. 1 are omitted as appropriate from FIG. 2.

The charge/discharge circuit 50 charges the capacitor 23 when the input current Iin is smaller than a current I1 (first current) when the charge circuit 10 charges the batteries 15 and 16 with the constant current, and discharges the capacitor 23 when the input current Iin is greater than the current I1. The charge/discharge circuit 50 includes a register 60, a bias voltage generation circuit 61, and a transconductance amplifier 62.

The register 60 (storage circuit) stores data DA transmitted from a microcomputer (not shown) via the terminal D. Note that the data DA is data indicative of the current value of the current I1.

The bias voltage generation circuit 61 (voltage generation circuit) generates a voltage V1 (first voltage) corresponding to the current value of the current I1, based on the data DA stored in the register 60. In an embodiment of the present invention, the voltage value of the voltage V1 becomes higher as the current value of the current I1 to be set becomes higher.

The transconductance amplifier 62 charges and discharges the capacitor 23 with the current corresponding to the voltage Va that becomes higher as the input current Iin increases and the voltage V1 indicative of the current I1. Specifically, when the current Iin is lower than the current I1, that is to say, when the voltage Va is lower than the voltage V1, the transconductance amplifier 62 charges the capacitor 23. Whereas, when the current Iin is higher than the current I1, that is to say, when the voltage Va is higher than the voltage V1, the transconductance amplifier 62 discharges the capacitor 23. Note that a charging voltage of the capacitor 23 is given as a voltage Vcap.

The discharge circuit 51 discharges the capacitor 23 when the input current Iin becomes greater than a predetermined current I2 (>I1). The discharge circuit 51 includes a bias voltage generation circuit 70, a comparator 71, a switch 72, and a constant current circuit 73.

The bias voltage generation circuit 70 generates a voltage V2 corresponding to the current value of the current I2 (second current). In an embodiment of the present invention, the voltage value of the voltage V2 is set higher than the voltage value of the voltage V1 so that the current I2 becomes greater than the current I1.

The comparator 71 (control circuit) turns on the switch 72 when the voltage Va becomes higher than the voltage V2, and turns off the switch 72 when the voltage Va becomes lower than the voltage V2. The switch 72 has one end connected to the capacitor 23 and the other end connected to the constant current circuit 73. Thus, when the switch 72 is turned on, the constant current circuit 73 discharges the electrical charge of the capacitor 23 with the constant current.

The determination circuit 52 determines whether the current Ib flowing through the NMOS transistor 31 is an overcurrent, based on the voltage Vb. Specifically, the determination circuit 52 is a circuit to determine that the current Ib is an overcurrent when the current Ib is greater than a predetermined current I3 (>I2) indicative of an overcurrent.

The switching circuit 53 includes resistors 90 to 92, a reference voltage circuit 93, an operational amplifier 94, a capacitor 95, and a drive circuit 96.

The resistors 90 and 91 divides the output voltage Vout to generate a feedback voltage Vfb, and the reference voltage circuit 93 generates a predetermined reference voltage Vref corresponding to the maximum value (e.g., 8.4 V) of the output voltage Vout.

The operational amplifier 94 (error amplifier circuit) has two non-inverting input terminals (+) and one inverting input terminal (−), and outputs a voltage corresponding to an error between the lower voltage out of the voltages respectively applied to the two non-inverting input terminals (+), and the voltage applied to the inverting input terminal (−). Here, out of the two non-inverting input terminals (+), one terminal is applied with the reference voltage Vref and the other terminal is applied with the voltage Vcap. Thus, when the voltage Vcap is lower than the reference voltage Vref, the error between the voltage Vcap and the feedback voltage Vfb is amplified, and when the reference voltage Vref is lower than the voltage Vcap, the error between the reference voltage Vref and the feedback voltage Vfb is amplified. The output of the operational amplifier 94 is connected to the resistor 92 and the capacitor 95 for compensating for the phase of a feedback loop of the switching circuit 53. Note that the voltage of the capacitor 95 is given as a voltage Vc.

The drive circuit 96 performs switching of the NMOS transistors 31 and 32 in a complementary manner, based on the level of the voltage Vc, when the current Ib is determined not to be an overcurrent. Specifically, the drive circuit 96 performs switching of the NMOS transistor 31 and the NMOS transistor 32 so that the output voltage Vout increases as the level of the voltage Vc becomes higher. Further, the drive circuit 96 turns off the NMOS transistor 31 when the current Ib is determined to be an overcurrent. The current Ib flowing through the NMOS transistor 31 when turned on is almost equal to the input current Iin. Thus, the current value of the input current Iin is limited up to the current value of the current I3.

Operation of Charge Circuit 10 in a State where Batteries 15 and 16 are Connected Thereto Constant-Current Charge First, a description will be given of an operation when the voltage Vcap is lower than the reference voltage Vref and the charge circuit 10 charges the batteries 15 and 16 with the constant current.

For example, when the input current Iin becomes greater than the current I1 with an increase in a charging current of the batteries 15 and 16, the voltage Va becomes greater than the voltage V1 indicative of the predetermined current I1. This causes the transconductance amplifier 62 to discharge the capacitor 23, thereby lowering the voltage Vcap. When the voltage Vcap is lowered, the capacitor 95 is discharged, thereby lowering the output voltage Vout. When the output voltage Vout used for charging the batteries 15 and 16 is lowered, the charging current of the batteries 15 and 16 decreases, thereby decreasing the input current Iin as well. As such, when the input current Iin becomes greater than the current I1, the charge circuit 10 decreases the input current Iin.

Whereas, for example, when the input current Iin becomes smaller than the current I1 with a decrease in the charging current, the output voltage Vout rises, contrary to the case described above. As a result, the charging current and the input current Iin increase. As such, the switching control circuit 35 charges the batteries 15 and 16 with the constant current so that the input current Iin becomes equal to the current I1.

Incidentally, when the batteries 15 and 16 are charged with the constant current (current I1), a battery voltage Vbat of the batteries 15 and 16 gradually rises. In such a state, if the output voltage Vout is constant, the charging current and the input current Iin gradually decrease. However, if the battery voltage Vbat gradually rises and the input current Iin decreases, the switching control circuit 35 causes the voltage Vcap to rise and the output voltage Vout to rise, as described above. As a result, the charge circuit 10 can continue to accurately charge the batteries 15 and 16 with the constant current, even when the battery voltage Vbat has risen.

Constant-Voltage Charge

As described above, when the batteries 15 and 16 continue to be charged with the constant current, the battery voltage Vbat rises. Then, when the battery voltage Vbat gets close to the maximum value of 8.4 V, the transconductance amplifier 62 charges the capacitor 23 so that the output voltage Vout becomes higher than 8.4 V. As a result, the voltage Vcap becomes higher than the reference voltage Vref when the output voltage Vout is 8.4 V. Thus, in an embodiment of the present invention, when the battery voltage Vbat gets close to the maximum value of 8.4 V, the switching circuit 53 performs switching of the NMOS transistors 31 and 32 so that the level of the feedback voltage Vfb becomes equal to the level of the reference voltage Vref. That is, when the charging voltage Vbat becomes high, the charge circuit 10 operates in the constant voltage mode, in which the batteries 15 and 16 are charged with the output voltage Vout of 8.4 V, changing from the constant current mode, in which the batteries 15 and 16 are charged with the constant current by making the input current Iin be equal to the current I1.

Figure 3:
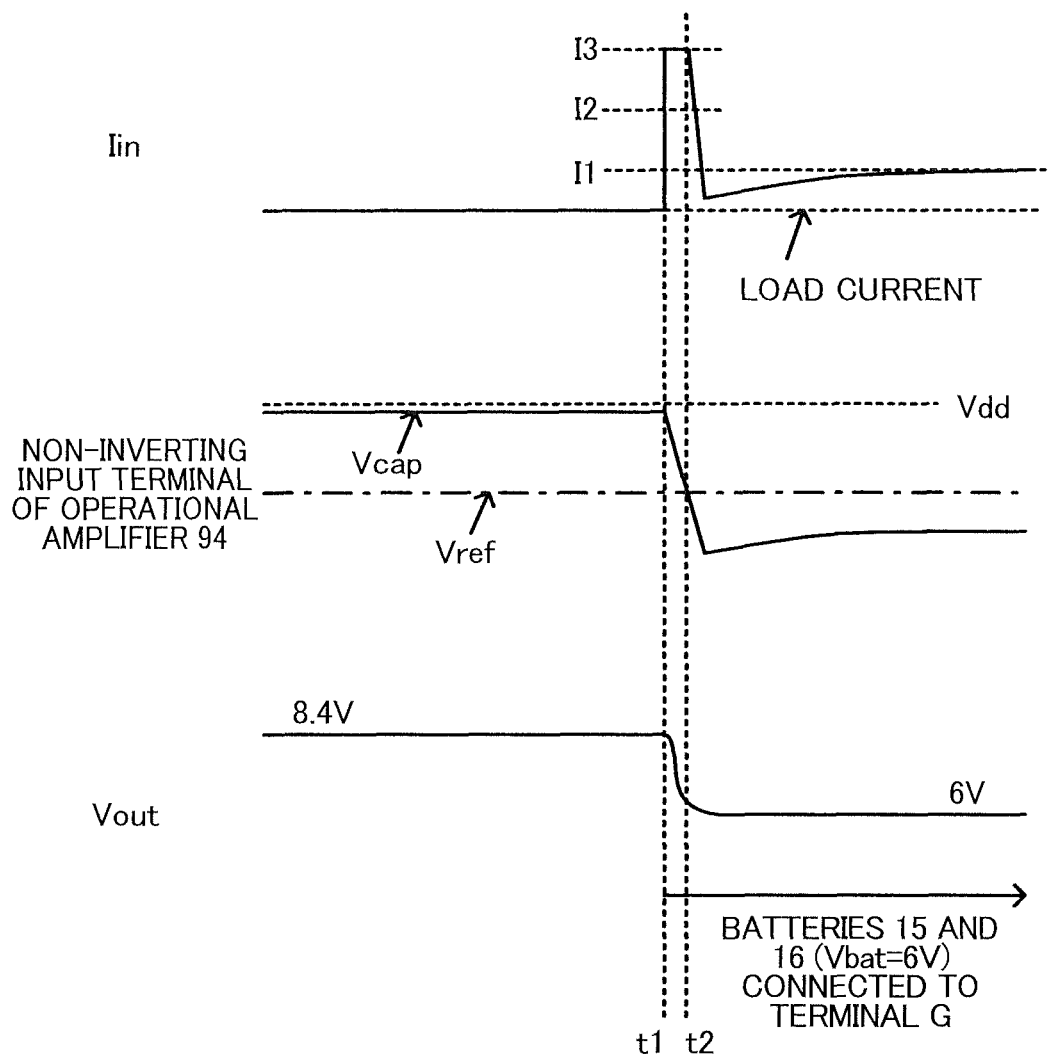
FIG. 3 is a diagram for describing an operation of a charge circuit 10 when batteries 15 and 16 are connected to a terminal G.

Operation of Charge Circuit 10 when Batteries 15 and 16 has been Connected to Terminal G Next, a description will be given of an operation of the charge circuit 10 when the batteries 15 and 16 having sufficient charging room are connected to the terminal G with reference to FIG. 3. Note that FIG. 3 is a diagram illustrating major waveforms of the charge circuit 10 before and after the batteries 15 and 16 are connected to the terminal G. In an embodiment of the present invention, it is assumed that consumption current of the load (not shown) of the microcomputer, etc., connected to the terminal G is sufficiently smaller than the current I1.

In such a state, the input current Iin is smaller than the current I1 and the voltage Va is lower than the voltage V1. Thus, the capacitor 23 continues to be charged by the transconductance amplifier 62 and the voltage Vcap (solid line) increases up to close to the level of a power supply voltage Vdd at which the transconductance amplifier 62 is activated. At this time, since the voltage Vcap becomes higher than the reference voltage Vref (dashed line), the output voltage Vout of 8.4 V continues to be generated.

At time t1, for example, when the batteries 15 and 16 of the battery voltage Vbat of 6 V are connected to the terminal G applied with the output voltage Vout of 8.4 V, an overcurrent flows from the input side of the charge circuit 10 to the batteries 15 and 16. Thus, the input current Iin rapidly increases. However, as described above, in an embodiment of the present invention, the input current Iin is limited up to the current I3. Further, at this time, since the input current Iin is greater than the current I1, the transconductance amplifier 62 starts to discharge the capacitor 23. Furthermore, here, the input current Iin has become greater than the current I2 (I1<I2<I3). Therefore, the switch 72 in FIG. 2 is turned on and the constant current circuit 73 also discharges the capacitor 23. Thus, the voltage Vcap rapidly drops. Note that, at this time, since the voltage Vcap is higher than the reference voltage Vref, the charge circuit 10 operates in the constant voltage mode.

Then, at time t2, when the voltage Vcap becomes lower than the reference voltage Vref, the charge circuit 10 starts operating in the constant-current mode. Thus, the input current Iin is controlled so as to become equal to the current I1.

The aforementioned charge control IC 20 is used, for example, in mobile devices such as a digital still camera, a digital video camera, a digital audio, and a portable navigation device. In this case, when the batteries 15 and 16 have been mounted in the mobile devices, charging can be performed from the input side of the charge circuit 10 to the batteries 15 and 16 without an overcurrent flowing.

Hereinabove, a description has been given of the charge circuit 10 applied with the charge control IC 20 according to one embodiment of the present invention. In an embodiment of the present invention, when an overcurrent occurs, the capacitor 23 is discharged by both of the transconductance amplifier 62 and the constant current circuit 73. Thus, for example, as compared with the case where the capacitor 23 is discharged only by the transconductance amplifier 62, the period of time required to shift the constant voltage mode to the constant current mode is reduced. Further, when the charge circuit 10 operates in the constant current mode, the input current Iin (charging current) is limited at the current I1. As such, when the input current Iin becomes an overcurrent, the charge circuit 10 can reduce the period of time required to decrease the input current Iin to the current I1. Thus, the charge circuit 10 can reduce an overcurrent.

Further, while it is assumed that the capacitor 23 is discharged by the constant current circuit 73, the charge of the capacitor 23 may be directly discharged by the switch 72, for example. Even in such a case, it becomes possible to reduce an overcurrent.

When the capacitor 23 is directly discharged by the switch 72, the input current Iin may become too small and it may take time to increase the input current Iin up to the current I1. Discharging the capacitor 23 by the constant current circuit 73 can prevent the voltage Vcap of the capacitor 23 from becoming too low. Thus, in such a case, since the input current Iin (charging current) can be brought to the current I1 within a shorter time, the charging time can be shortened.

Further, the current I1 is determined based on the data DA. Therefore, the charge circuit 10 can bring the charging current (input current Iin) to a value desirable for a user.

Furthermore, the drive circuit 96 turns off the NMOS transistor 31 when the current Ib flowing through the NMOS transistor 31 becomes an overcurrent (current I3). Thus, the drive circuit 96 can prevent the NMOS transistor 31, etc., from being damaged by an overcurrent.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A charge control circuit configured to control a charge circuit configured to generate, from an input power supply, an output voltage for charging a battery at a terminal connected to the battery, the charge control circuit comprising:
   a charge/discharge circuit configured to charge a capacitor when an input current from the input power supply is smaller than a first current, and discharge the capacitor when the input current is greater than the first current;
   a discharge circuit configured to discharge the capacitor when the input current becomes greater than a second current greater than the first current;
   an error amplifier circuit configured to amplify an error between a lower voltage out of a charging voltage of the capacitor and a reference voltage corresponding to a maximum value of the output voltage, and a feedback voltage corresponding to the output voltage; and
   a drive circuit configured to perform switching of a transistor of a booster circuit including an inductor supplied with the input current, including the transistor configured to increase an inductor current flowing through the inductor when the transistor is turned on, and being configured to boost the output voltage by supplying the inductor current to the terminal when the transistor is off, in such a manner that the error becomes smaller.

2. The charge control circuit of claim 1, wherein the discharge circuit includes
   a switch connected to the capacitor so as to discharge the capacitor when turned on, and
   a control circuit configured to turn on the switch when the input current becomes greater than the second current, and turn off the switch when the input current becomes smaller than the second current.

3. The charge control circuit of claim 2, wherein the discharge circuit further includes a constant current circuit configured to discharge the capacitor with a constant current when the switch is turned on.

4. The charge control circuit of claim 1, wherein the charge/discharge circuit includes:
   a storage circuit configured to store data indicative of magnitude of the first current; and
   a voltage generation circuit configured to generate a first voltage corresponding to the data stored in the storage circuit, and wherein
   the charge/discharge circuit is further configured to charge the capacitor when the input current is smaller than the first current, and discharge the capacitor when the input current is greater than the first current, based on the first voltage and a second voltage corresponding to the input current.

5. The charge control circuit of claim 2, wherein
   the charge/discharge circuit includes:
   a storage circuit configured to store data indicative of magnitude of the first current; and
   a voltage generation circuit configured to generate a first voltage corresponding to the data stored in the storage circuit, and wherein
   the charge/discharge circuit is further configured to charge the capacitor when the input current is smaller than the first current, and discharge the capacitor when the input current is greater than the first current, based on the first voltage and a second voltage corresponding to the input current.

6. The charge control circuit of claim 3, wherein
   the charge/discharge circuit includes:
   a storage circuit configured to store data indicative of magnitude of the first current; and
   a voltage generation circuit configured to generate a first voltage corresponding to the data stored in the storage circuit, and wherein
   the charge/discharge circuit is further configured to charge the capacitor when the input current is smaller than the first current, and discharge the capacitor when the input current is greater than the first current, based on the first voltage and a second voltage corresponding to the input current.

7. The charge control circuit of claim 4, wherein
   the charge/discharge circuit includes a transconductance amplifier configured to compare the first voltage and the second voltage, and
   is further configured to charge the capacitor when the input current is smaller than the first current, and discharge the capacitor when the input current is greater than the first current, based on an output of the transconductance amplifier.

8. The charge control circuit of claim 5, wherein
   the charge/discharge circuit includes a transconductance amplifier configured to compare the first voltage and the second voltage, and
   is further configured to charge the capacitor when the input current is smaller than the first current, and discharge the capacitor when the input current is greater than the first current, based on an output of the transconductance amplifier.

9. The charge control circuit of claim 6, wherein
   the charge/discharge circuit includes a transconductance amplifier configured to compare the first voltage and the second voltage, and
   is further configured to charge the capacitor when the input current is smaller than the first current, and discharge the capacitor when the input current is greater than the first current, based on an output of the transconductance amplifier.

10. The charge control circuit of claim 1, further comprising:
a determination circuit configured to determine whether a current flowing through the transistor is greater than a third current that greater than the second current, wherein
the drive circuit is further configured to
perform switching of the transistor in such a manner that the error becomes smaller, when a current flowing through the transistor is smaller than the third current, and
turn off the transistor, when the current flowing through the transistor is greater than the third current.

11. The charge control circuit of claim 2, further comprising:
a determination circuit configured to determine whether a current flowing through the transistor is greater than a third current greater than the second current, wherein
the drive circuit is further configured to
perform switching of the transistor in such a manner that the error becomes smaller, when a current flowing through the transistor is smaller than the third current, and
turn off the transistor, when the current flowing through the transistor is greater than the third current.

12. The charge control circuit of claim 3, further comprising:
a determination circuit configured to determine whether a current flowing through the transistor is greater than a third current greater than the second current, wherein
the drive circuit is further configured to perform switching of the transistor in such a manner that the error becomes smaller, when a current flowing through the transistor is smaller than the third current, and
turn off the transistor, when the current flowing through the transistor is greater than the third current.

13. The charge control circuit of claim 4, further comprising:
a determination circuit configured to determine whether a current flowing through the transistor is greater than a third current greater than the second current, wherein
the drive circuit is further configured to
perform switching of the transistor in such a manner that the error becomes smaller, when a current flowing through the transistor is smaller than the third current, and
turn off the transistor, when the current flowing through the transistor is greater than the third current.

14. The charge control circuit of claim 1, wherein the error amplifier circuit having an output connected to a resistor and a capacitor to compensate for a phase of a feedback loop in which the feedback voltage is fed back to the error amplifier circuit.

15. The charge control circuit of claim 14, wherein the resistor and the capacitor are connected in series.

16. The charge control circuit of claim 1, further comprising:
a voltage-dividing resistor configured to generate the feedback voltage from the output voltage.

17. The charge control circuit of claim 2, wherein the control circuit includes a comparator configured to compare the second voltage and a voltage corresponding to the second current, and is further configured to turn on the switch when the input current becomes greater than the second current, and turn off the switch when the input current becomes smaller than the second current, based on an output of the comparator.

18. The charge control circuit of claim 1, wherein the first current is a current having a current value when the battery is charged with a constant current.

19. A charge circuit configured to generate, from an input power supply, an output voltage for charging a battery at a terminal connected to the battery, the charge circuit comprising:
a booster circuit including an inductor supplied with an input current and a transistor configured to increase an inductor current flowing through the inductor when the transistor is turned on, the booster circuit configured to boost the output voltage by supplying the inductor current to the terminal when the transistor is off; and
a charge control circuit, the charge control circuit including:
a charge/discharge circuit configured to charge a capacitor when the input current from the input power supply is smaller than a first current, and discharge the capacitor when the input current is greater than the first current;
a discharge circuit configured to discharge the capacitor when the input current becomes greater than a second current greater than the first current;
an error amplifier circuit configured to amplify an error between a lower voltage out of a charging voltage of the capacitor and a reference voltage corresponding to a maximum value of the output voltage, and a feedback voltage corresponding to the output voltage; and
a drive circuit configured to perform switching of the transistor so that the error becomes smaller.

20. A mobile device including a charge circuit configured to generate, from an input power supply, an output voltage for charging a battery at a terminal connected to the battery, the charge circuit including:
a booster circuit including an inductor supplied with an input current and a transistor configured to increase an inductor current flowing through the inductor when the transistor is turned on, the booster circuit configured to boost the output voltage by supplying the inductor current to the terminal when the transistor is off; and
a charge control circuit, the charge control circuit including
a charge/discharge circuit configured to charge a capacitor when the input current from the input power supply is smaller than a first current, and discharge the capacitor when the input current is greater than the first current;
a discharge circuit configured to discharge the capacitor when the input current becomes greater than a second current greater than the first current;
an error amplifier circuit configured to amplify an error between a lower voltage out of a charging voltage of the capacitor and a reference voltage corresponding to a maximum value of the output voltage, and a feedback voltage corresponding to the output voltage; and
a drive circuit configured to perform switching of the transistor so that the error becomes smaller.

* * * * *